March 25, 1924.  1,488,086
C. ZIEGLOWSKY
HOG WATERER
Filed April 3, 1923
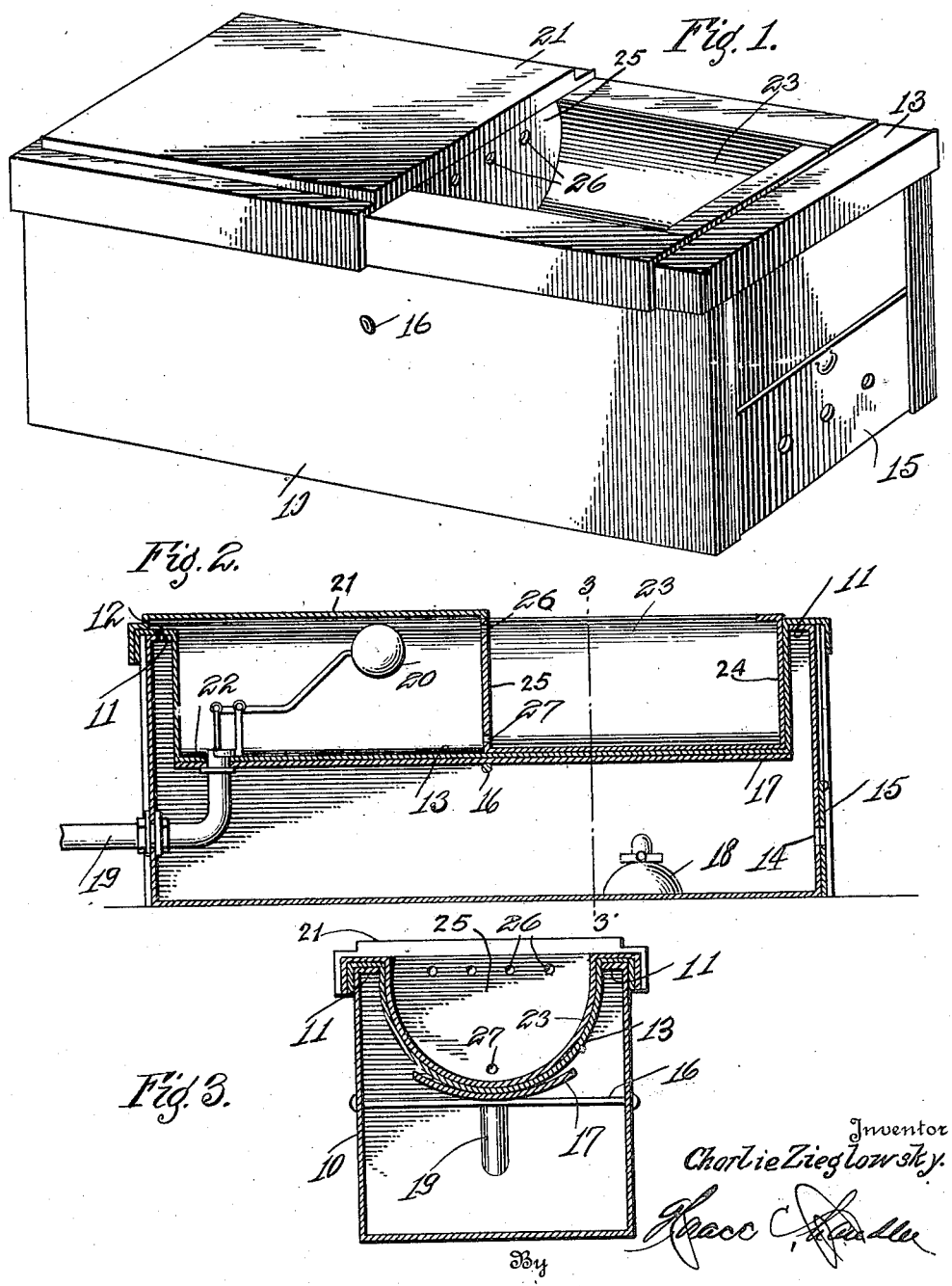

Patented Mar. 25, 1924.

1,488,086

UNITED STATES PATENT OFFICE.

CHARLIE ZIEGLOWSKY, OF AINSWORTH, IOWA.

HOG WATERER.

Application filed April 3, 1923. Serial No. 629,632.

*To all whom it may concern:*

Be it known that I, CHARLIE ZIEGLOWSKY, a citizen of the United States, residing at Ainsworth, in the county of Washington, State of Iowa, have invented certain new and useful Improvements in Hog Waterers; and I do hereby declare the following to be a full, clear, and exact description of the invention, such as will enable others skilled in the art to which it appertains to make and use the same.

This invention relates to new and useful improvements in drinking troughs, and particularly to drinking troughs especially adapted for the use of hogs.

One object of the invention is to provide a device of this character which includes means for more effectively heating the water than devices heretofore.

Another object is to provide a device of this character which is simple in construction, strong and durable, as well as effective in operation, and which can be manufactured at a comparatively low cost.

Other objects and advantages will be apparent from the following description when taken in connection with the accompanying drawing.

In the drawing:

Figure 1 is a perspective view of a hog watering trough made in accordance with the invention.

Figure 2 is a vertical longitudinal central sectional view through the device.

Figure 3 is a vertical transverse sectional view through the device, on the line 3—3 of Figure 1.

Referring particularly to the accompanying drawing, 10 represents an elongated box of suitable dimensions, with the upper edges of one end and the two longer sides extended horizontally inwardly, as at 11, to form flanges. The longer flanges 11, adjacent one end of the box, being formed with longitudinal series of openings 12, to which reference will be made later herein. Disposed within the box, and extending longitudinally thereof, is the trough 13, the same being transversely arcuate, as shown in the Figure 3.

In the lower end portion of one end of the box there are formed the draft openings 14, which are arranged to be controlled by the apertured sliding plate 15.

Extending transversely through the intermediate portion of the box is a rod 16, for supporting the center of the trough, and disposed beneath the curved bottom of the trough 13 is a guard plate 17, which protects the bottom of the trough from direct contact of the flame from the source of heat 18, said source being shown as an oil lamp.

Extending into the bottom of the trough 13, at a point remote from the draft slide 15, is a water inlet pipe 19, the same being provided with a float valve 20, for controlling the inflow of water to the trough. A lid or cover 21 is disposed over one half of the upper side of the box, preferably that portion within which is located the float valve 20, said cover being spaced a short distance above the flanges 11, to provide a passage for the heat, from the lamp, to escape over the surface of the water in the trough, the end of the cover adjacent the drinking opening 22, being or constituting one side wall of said drinking opening.

It will thus be seen that the heat from the lamp will travel along the bottom of the trough, to raise the temperature of the water therein, and thence upwardly through the openings 12, beneath the cover 21, and across the surface of the water, escaping from beneath the edge of the cover, at the side of the drinking opening 22. Thus the water is acted upon by the heat, both from beneath the trough, and also thereabove, with the result that economy in fuel is practiced, and the water more effectively heated.

Disposed removably within the end of the trough, below the drinking opening, is a mud-receiving pan 23, the same being of the same curvature and height of the trough, but only one-half the length thereof. This pan is open at the upper side, and has the end walls 24 and 25, the former being imperforate, while the latter is formed with a horizontal row of openings 26, and a larger single opening adjacent the lower end thereof, as shown at 27. The upper edge of the wall 25 is disposed in contact with the adjacent end of the cover 21, which would otherwise prevent the heat from the lamp below passing over the surface of the water, but by providing the row of openings adjacent the upper end of the wall 25, the heat can readily pass therethrough and over the surface of the water within the drinking opening. In this pan 23 the mud from the water will settle, and by lifting the pan from the trough, the water will drain into the trough through the opening 27, and permit the mud to remain in the pan, from which it may be readily cleaned.

What is claimed is:

1. A hog watering device including a receptacle, a trough disposed within the receptacle and having peripheral flanges resting on the edge of the receptacle and spacing the walls of the trough from the side walls of the receptacle, openings in one of the said flanges, a cover over one end of the receptacle and trough and having its upper wall spaced above said openings, the cover having a depending apertured wall intermediate the length of the trough, and a supplemental mud receiving trough forming a part of the cover and in the other portion of the trough.

2. A hog watering device including a receptacle, a trough suspended within and spaced from the side walls of the receptacle, said trough having peripheral flanges resting on the open upper portion of the receptacle, certain of the flanges having openings, a cover disposed over one end of the receptacle and trough and having a depending wall at its inner end and a supplemental trough extending from the marginal edges of said depending wall and snugly fitted within the uncovered portion of the first-named trough, the upper portion of the depending wall having heat transmitting openings, the lower portion of the wall having water transmitting openings, and a heat source beneath the uncovered portion of the trough arranged to direct its heat around the trough and through said heat transmitting openings.

In testimony whereof, I affix my signature, in the presence of two witnesses.

CHARLIE ZIEGLOWSKY.

Witnesses:
 FLO VOS BURG,
 ADA GRAY HOLLINGSWORTH.